Figure 1:
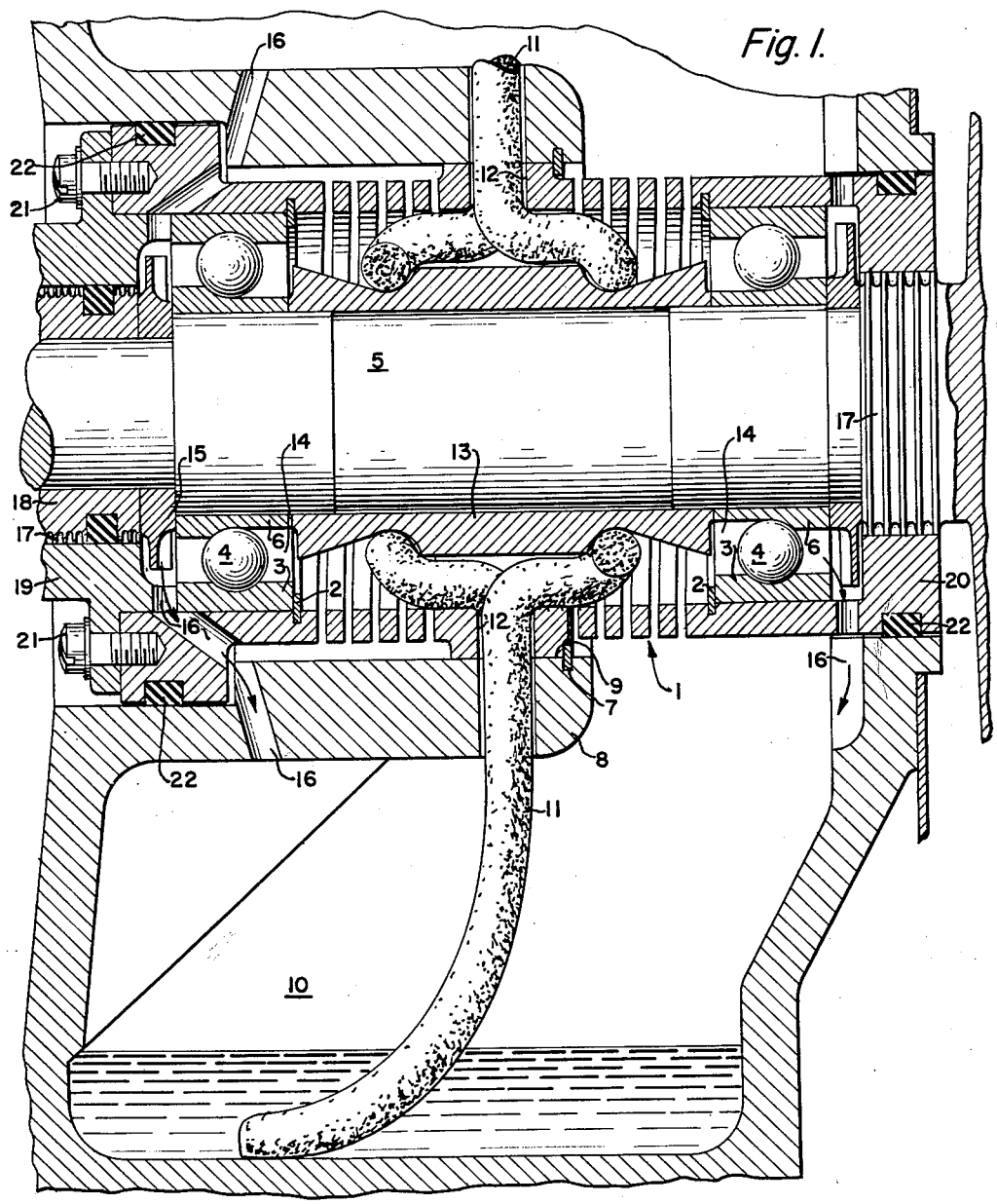

June 1, 1965   J. E. CHAPMAN ETAL   3,186,779
RESILIENT MOUNT ASSEMBLY FOR SHAFT STRUCTURE
Filed May 4, 1962

INVENTORS:
JAMES E. CHAPMAN,
EUGENE S. COX,
BY

Attorney.

United States Patent Office 3,186,779
Patented June 1, 1965

3,186,779
RESILIENT MOUNT ASSEMBLY FOR SHAFT STRUCTURE
James E. Chapman and Eugene S. Cox, Palos Verdes Estates, Calif., assignors to The Garrett Corporation, Los Angeles, Calif., a corporation of California
Filed May 4, 1962, Ser. No. 192,379
5 Claims. (Cl. 308—184)

This invention relates to a resilient mount assembly for shaft structure and in particular relates to a resilient mount assembly for shaft bearing and sealing members wherein an unbalanced mass may be rotated about an axis other than the axis passing through the geometric center of the mounting assembly, so as to insure continuous concentricity of the shaft member and the sealing members surrounding the shaft member.

In providing mounting structure for a rotating shaft member it has been found that provision must be made for shaft radial movement as well as for shaft axial movement. Also, provision must be made for the adequate and continuous lubrication of bearing members which support the rotational movement of the shaft member. Further, provision must be made within the mounting assembly for effectively sealing lubricant supplied to the bearing members so that lubricant does not flow to the exterior of the mounting assembly and thereby impair the adequate and continuous lubrication of the bearing members.

It has been found that one of the major problems in providing a mounting assembly for rotating shaft structure has been the difficulty of providing structure which will effectively maintain concentricity for a shaft member and sealing members which surround the shaft member. Heretofore, as unbalanced loads have developed with the rotation of a shaft member concentricity of a shaft member and the sealing members has not been maintained. Consequently, undesirable results, such as loss of bearing lubricant fluid, and the like, have been experienced.

Accordingly, it is an object of this invention to provide a resilient mount assembly for a rotating shaft member which will assure continuous concentricity for the shaft member and sealing members surrounding the shaft member.

Another object of this invention is to provide a resilient mount assembly for rotating shaft structure wherein an unbalanced mass may be rotated about an axis other than the axis passing through the geometric center of the mounting assembly.

Another object of this invention is to provide a resilient mount assembly which effectively exerts an axial force against the shaft bearing members and also accommodates both radial and axial movement of the rotating shaft structure.

Another object of this invention is to provide a resilient mount assembly for a rotating shaft member wherein adequate and continuous lubrication for the shaft bearing members is effectively maintained.

Another object of this invention is to provide a resilient mount assembly for a rotating shaft member wherein lubricant supplied to shaft bearing members is recirculated through the mount assembly so as to continuously lubricate the bearing members.

Another object of this invention is to provide a resilient mount assembly for a rotating shaft member wherein radial movement of the shaft members is dampened so as to prevent excessive radial movement of the shaft member and mount assembly.

That these and other objects and advantages of the invention are obtained will be readily apparent from the following detailed description, when read in conjunction with the accompanying drawing in which:

FIG. 1 is a cross sectional view of the resilient mount assembly.

Referring to the drawing, reference character 1 designates a spring member. Spring 1 is a helically slotted resilient shell member which acts as a pre-load spring and a radially resilient member. Spring 1 exerts a force in an outward direction against snap-ring members 2. Snap-rings 2 are located in juxtaposition to bearing outer rings 3. Reference character 4 designates bearing members which support the rotational movement of a shaft 5. Positioned intermediate the shaft 5 and bearing members 4 are inner rings 6. Rings 6 are free to rotate with shaft 5 and these rings with a raceway, support bearing members 4. A snap-ring 7 is attached to housing structure 8. Snap-ring 7 is located in juxtaposition to spring 1. Snap-ring 7 maintains spring 1 in a predetermined axial position with respect to housing 8 and thus spring 1 is positively attached to housing 8. The center portion of spring 1 is supported by housing 8 as shown by reference charcter 9.

Reference character 10 designates a reservoir space within housing 8. Lubricant fluid for lubricating bearing members 4 is retained in reservoir 10. Lubricant fluid is drawn from reservoir 10 by a lubrication wick 11. Lubrication wick 11 passes through openings 12 in spring 1 and housing 8. The lubrication wick 11 circumscribes shaft spacer structure 13. Lubricant which is drawn from reservoir 10, through wick 11, flows through openings 14 on to the bearing members 4. Lubricant for bearing members 4 is propelled by bearing slinger members 15. Slingers 15 rotate with shaft 5 and the rotary motion of the slinger members creates a centrifugal effect which propels lubricant fluid past bearing members 4 and thence through openings 16 in spring 1 and housing 8 into the reservoir 10. In this manner a continuous flow of lubricant fluid is supplied to bearing members 4 while shaft 5 is rotating.

Reference character 17 designates labyrinth seals which are formed by shaft member 18 and mount members 19 and 20. Member 19 is attached to spring 1 by means of a plurality of bolts 21. Member 20 may be a unitary part of spring 1. The seal 17 prevents bearing lubricant from flowing to the exterior of the mounting assembly. Thus, a return of the lubricant to reservoir 10 is assured so that the bearings 4 may be continuously and adequately lubricated to support the rotational movement of shaft 5.

Reference character 22 designates sealing rings, or spring members, which circumscribe the resilient mount assembly and act to dampen radial movement of the shaft and mount assembly.

It will be apparent to those skilled in the art that the novel principles disclosed will suggest other variations and modifications of the same. It is accordingly desired that the invention shall not be limited to the specific embodiment thereof described herein.

Having thus described our invention, we claim:

1. A bearing structure for high speed machinery comprising, in combination:
    a shaft;
    bearing means rotatably supporting the shaft;
    a rigid housing structure around and spaced from at least a part of the shaft;
    and means for supporting the bearing means resiliently for limited axial and radial movement of the bearing and shaft, said bearing support means including an annular member surrounding the shaft and having a first portion supported by direct non-resilient engagement with the housing;
    a second portion spaced substantially axially along said shaft from the first portion engaging the bearing means to support the bearing;

and an axially disposed resilient section interconnecting the first and second portions of the annular member and permitting limited axial and radial movement of the second portion relative to the first portion.

2. A bearing structure as in claim 1 that also comprises resilient sealing means carried by the annular member and engaging the housing to retain lubricant within the bearing structure.

3. A bearing structure as in claim 1 in which the resilient section is integral with the first and second portions and is formed by cutting a helical slot in the annular member.

4. A bearing structure for high speed machinery comprising, in combination:
   a shaft;
   bearing means rotatably supporting the shaft at positions spaced axially thereof;
   a rigid housing structure around and spaced from at least a part of the shaft;
   and means for supporting the bearing means resiliently for limited axial and radial movement of the bearing and shaft, said bearing support means including an annular member surrounding the shaft and having a central portion rigidly supported by the housing;
   end portions axially spaced from the central portion and at either side thereof engaging the bearing means to support the bearing;
   and a resilient section interconnecting the central and end portions of the annular member and permitting limited axial and radial movement of the end portions relative to the central portion.

5. A bearing structure as in claim 4 that also comprises resilient sealing means carried by the annular member at positions spaced axially outwardly of the bearing means and engaging the housing to retain lubricant within the bearing structure.

References Cited by the Examiner
UNITED STATES PATENTS

| | | | |
|---|---|---|---|
| 1,807,026 | 5/31 | Brittain | 308—187 |
| 2,000,581 | 5/35 | Coffin | 308—187 |
| 2,504,776 | 4/50 | Woodfield et al. | 308—184 |
| 2,628,871 | 2/53 | Powers | 308—184 |
| 2,861,848 | 11/59 | Lovelock et al. | 308—187 |
| 2,911,138 | 11/59 | Birmann | 308—184 X |
| 3,004,806 | 10/61 | Schinnerer | 308—187 |
| 3,017,230 | 1/62 | Meermans | 308—187 |

ROBERT C. RIORDON, *Primary Examiner.*

FRANK SUSKO, *Examiner.*